US007441052B2

(12) United States Patent
Demaray et al.

(10) Patent No.: US 7,441,052 B2
(45) Date of Patent: Oct. 21, 2008

(54) METHODS AND APPARATUSES FOR PROVIDING COPIES OF STORED DATA FOR DISASTER RECOVERY AND OTHER USES

(75) Inventors: Milton W. Demaray, Fremont, CA (US); Thomas A. Attanese, Pennington, NJ (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 361 days.

(21) Appl. No.: 10/674,805

(22) Filed: Sep. 29, 2003

(65) Prior Publication Data

US 2005/0081098 A1    Apr. 14, 2005

(51) Int. Cl.
*G06F 13/00* (2006.01)
*G06F 3/00* (2006.01)
(52) U.S. Cl. .............................. 710/9; 710/16; 707/204; 711/221
(58) Field of Classification Search ...................... 710/9, 710/16; 711/221; 707/204
See application file for complete search history.

(56) References Cited

U.S. PATENT DOCUMENTS

| 5,459,857 | A  | 10/1995 | Ludlam et al. |
|-----------|----|---------|---------------|
| 5,822,773 | A  | 10/1998 | Pritchard et al. |
| 6,157,991 | A  | 12/2000 | Arnon |
| 6,189,079 | B1 | 2/2001  | Micka et al. |
| 6,269,431 | B1 | 7/2001  | Dunham |
| 6,289,398 | B1 | 9/2001  | Stallmo et al. |
| 6,295,575 | B1 | 9/2001  | Blumenau et al. |
| 6,308,284 | B1 | 10/2001 | LeCrone et al. |
| 6,324,654 | B1 | 11/2001 | Wahl et al. |
| 6,356,977 | B2 | 3/2002  | Ofek et al. |
| 6,405,294 | B1 | 6/2002  | Hayter |
| 6,408,369 | B1 | 6/2002  | Garrett et al. |
| 6,513,102 | B2 | 1/2003  | Garrett et al. |
| 6,529,995 | B1 | 3/2003  | Shepherd |
| 6,539,461 | B2 | 3/2003  | Suzuki et al. |

(Continued)

FOREIGN PATENT DOCUMENTS

WO    WO-2005/033941    4/2005

OTHER PUBLICATIONS

WO-2005/033941—International Search Report and Written Opinion of the International Searching Authority (cited references previously disclosed with Information Disclosure Statement filed on Feb. 14, 2006, consisting only of U.S. patents and published applications).

(Continued)

*Primary Examiner*—Tariq R. Hafiz
*Assistant Examiner*—Scott Sun
(74) *Attorney, Agent, or Firm*—Larry Mendenhall, Esq.; David N. Lathrop, Esq.; Gallagher & Lathrop

(57) ABSTRACT

A disaster recovery technique for computer systems obtains backup copies of data by arranging recording devices like direct-access disk devices into copy pairs of primary and secondary devices. Management of the device copy pairs within a single system and across multiple systems is facilitated by constructing maps of device information that provide a cross-reference between I/O subsystem device numbers and hardware addresses. Information structures are constructed from the maps and used to facilitate defining and managing groups of device copy pairs.

32 Claims, 5 Drawing Sheets

U.S. PATENT DOCUMENTS

| | | |
|---|---|---|
| 6,629,264 B1 | 9/2003 | Sicola et al. |
| 6,643,667 B1 | 11/2003 | Arai et al. |
| 6,647,460 B2 | 11/2003 | Kodama |
| 7,032,091 B2 * | 4/2006 | Ueno ......................... 711/162 |
| 2002/0083263 A1 | 6/2002 | Petruschka et al. |
| 2003/0115433 A1 * | 6/2003 | Kodama ..................... 711/162 |
| 2003/0131278 A1 | 7/2003 | Fujibayashi |
| 2003/0149736 A1 | 8/2003 | Berkowitz et al. |
| 2003/0177323 A1 | 9/2003 | Popp et al. |
| 2003/0188114 A1 | 10/2003 | Lubbers et al. |
| 2003/0196052 A1 | 10/2003 | Bolik et al. |
| 2003/0221075 A1 * | 11/2003 | Achiwa et al. .............. 711/162 |
| 2004/0111485 A1 * | 6/2004 | Mimatsu et al. ............. 709/213 |
| 2004/0128442 A1 * | 7/2004 | Hinshaw et al. ............. 711/114 |
| 2004/0193796 A1 * | 9/2004 | Takamoto et al. ........... 711/113 |
| 2005/0010733 A1 * | 1/2005 | Mimatsu et al. ............. 711/162 |
| 2005/0193034 A1 * | 9/2005 | Kitsuregawa et al. ....... 707/202 |
| 2006/0010180 A1 * | 1/2006 | Kawamura et al. .......... 707/204 |

OTHER PUBLICATIONS

European Patent Office—Aug. 18, 2006—Examination report for Appl. No. 04 784 444.4-2224.

Applicant's Dec. 18, 2006 Response to European Patent Office—Examination report for Application No. 04 784 444.4-2224 dated Aug. 18, 2006.

European Patent Office-Jan. 23, 2007—Examination report for Application No. 04 784 444.4 -2224.

Applicant's May 23, 2007 Response to European Patent Office-Examination report Application No. 04 784 444.4 -2224 dated Jan. 23, 2007.

European Patent Office—Jul. 19, 2007 Communication under Rule 51(4) EPC informing of intention to grant European patent.

* cited by examiner

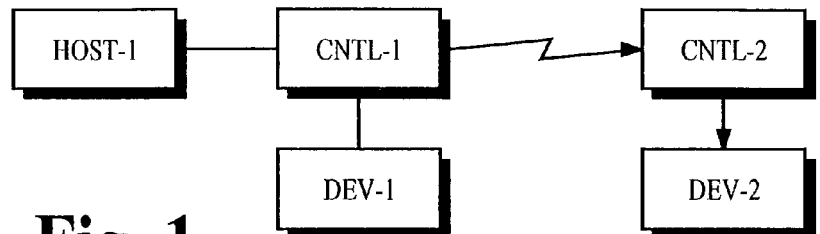
Fig. 1
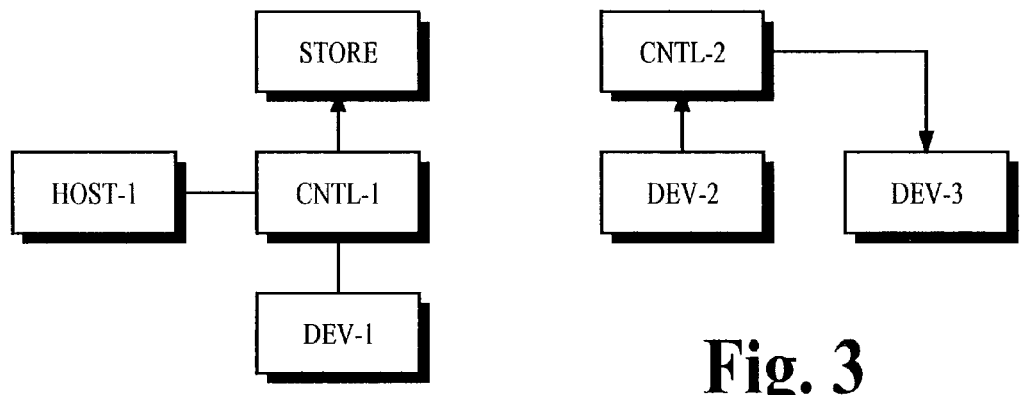
Fig. 2
Fig. 3
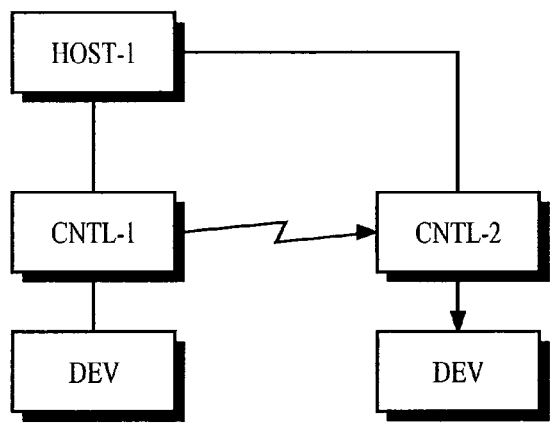
Fig. 4

```
              SCAN DEVICE NUMBERS

SPECIFY RANGE OF DEVICE NUMBERS TO SCAN.

START:  _____        END:  _____

F1=HELP    F3=EXIT    F6=SCAN    F12=CANCEL
```

```
                DEVICE SCAN RESULTS
SYSTEM: PROD
DESCRIPTION: HDS 7700E LOC 10@23X462
CONTROLLER S/N: 5389
SSID: B301      LSS: 00
===============================================
CCA   DEVNO   VOLSER    CCA   DEVNO   VOLSER
---   -----   ------    ---   -----   ------
0B    370E    VLB301    10    36EF    VLB303
0C    37A5    VLB308    11    3721    VLB306
0D    36F8    VLB295    1F    3717    VLB305
0E    3777    VLB288    20    36F2    VLB315
0F    372D    VLB312    21    3705    VLB322

F1=HELP   F3=EXIT   F7=SCRL DN   F8=SCRL UP
```

Fig. 5B

```
                DEVICE MAP
SYSTEM: PROD
       VOLSER   DEVNO   CNTL   SSID   LSS   CCA
       ------   -----   ----   ----   ---   ---
       VLB301   370E    5389   B301   00    0B
       VLB301   3705    6872   D827   00    28
       VLB303   36EF    5389   B301   00    10
       VLB303   36FE    6872   D827   00    03
       VLB305   3717    5389   B301   00    1F
       VLB305   36F8    2890   4F6C   00    08
       VLB306   3721    5389   B301   00    11
       VLB306   36B6    6872   D827   00    01
       VLB308   37A5    5389   B301   00    0C
       VLB308   36C8    6872   D827   00    02
F1=HELP   F3=EXIT   F7=SCRL DN   F8=SCRL UP
```

Fig. 5C

```
            COPY GROUP DETAIL
                 GROUP ID:  DALLAS.TO.SF

Supported actions: Add  Delete

Primary ------    Secondary ----
ACT  VOLSER  DEVN CNTL ...    DEVN CNTL ...
---  ------  ---- ---- ...    ---- ---- ...
___  VLB295  36F8 5389 ...    287A 4F6C ...
___  VLB301  370E 5389 ...    3705 6872 ...
___  VLB303  36EF 5389 ...    36FE 6872 ...
___  VLB305  3717 5389 ...    2890 4F6C ...
___  VLB306  3721 5389 ...    36B6 6872 ...
___  VLB308  37A5 5389 ...    36C8 6872 ...
F1=HELP   F3=EXIT   F7=SCRL DN   F8=SCRL UP
```

Fig. 5D

```
            MANAGE COPY GROUPS

Supported actions: Load Query Suspend
                   Resync Dissolve

ACT  COPY GROUP              STATUS
---  -------------           ----------------
___  SF.TO.LA                SUSPENDED
___  LA.TO.SF                RESYNC PENDING
___  DALLAS.TO.SF            DUPLEXING
___  SF.TO.SF                DISSOLVED

F1=HELP   F3=EXIT   F7=SCRL DN   F8=SCRL UP
```

Fig. 5E

METHODS AND APPARATUSES FOR PROVIDING COPIES OF STORED DATA FOR DISASTER RECOVERY AND OTHER USES

TECHNICAL FIELD

The present invention pertains generally to methods and apparatuses that can provide copies of data stored by recording devices in computer system, and pertains more specifically to improving the ability to provide these copies for disaster recovery and other uses.

BACKGROUND ART

Industry and commerce have become so dependent on computer systems with online or interactive applications that an interruption of only a few minutes in the availability of those applications can have serious consequences. Outages of more than a few hours can sometimes threaten a company's or an institution's existence. In some cases, regulatory requirements can impose fines or other penalties for disruptions or delays in services that are caused by application outages.

As a consequence of this growing intolerance for application outages, there is a keen interest in improving the availability of these applications during normal operations and in decreasing the amount of time needed to recover from equipment failure or other disastrous situations.

A common approach for disaster recovery is to use whatever remains after the disaster to provide a system with all necessary applications having access to a recent copy of the data needed to support the applications. A number of copy techniques are known that can provide a copy of the data needed to support an application after a disaster or other abnormal event. These techniques are known by a variety of names and differ in a number of respects but they are similar in that they all copy data that is stored on one or more primary recording devices onto one or more secondary recording devices.

Practical implementations of disaster recovery mechanisms usually define pairs of primary and secondary recording devices and provide processes that facilitate operations with the pairs. Normal computer center operations typically require changes to the definition of one or more pairs and to the operational status of devices in the pairs so that copying between respective primary and secondary recording devices can be suspended or resumed. For example, changes in pair definitions may be needed to allow data to be moved from one recording device to another to improve system performance or to recover from a hardware failure. Changes in operational status may be needed to suspend copying so that data stored by the secondary recording devices can be accessed by a batch application, for example, or be copied to tertiary recording devices to provide an additional level of security for recovery purposes.

In conventional mainframe computer systems, changes to copy pairs are initiated by software executing in a mainframe computer in response to commands specified by an operator. This approach is not attractive because errors are likely in the operator input required to specify these commands and because considerable time is needed to specify all of the parameters and other information needed by the commands. In addition, the time needed to carry out each command is excessive. For example, the time required in conventional systems to change the operational status of one copy pair can be on the order of ten seconds. In situations where an operational change must be carried out for thousands of recording devices, the total time needed to complete a requested change can easily exceed an hour. The needs of some applications require frequent changes in operational status; however, the time required to change status severely restricts when and how often such changes can be made.

The disadvantages of the conventional approaches are compounded if the recovery mechanism includes a complex of multiple computer systems. Commands and parameters used to define copy pairs may be valid for only one of the computer systems in the complex. Additional commands and parameters must be specified for use in other computer systems in the complex to access either primary or secondary recording devices unless care is taken to ensure all relevant hardware and software identifications of the recording devices are the same for all of the computer systems. This is generally very difficult if not impossible to achieve. As a result, changes in one computer system that affect copy pair definitions must be reflected in changes to parameters for not only that particular computer system but also for all other computer systems in the complex. This additional requirement increases the likelihood that a mistake or oversight will introduce errors that can adversely affect the ability to recover from a disaster or other event.

DISCLOSURE OF INVENTION

It is an object of the present invention to improve methods and apparatuses for providing copies of stored data in computer systems for disaster recovery and other uses.

According to one aspect of the present invention in a system having a first computer coupled to one or more controllers that are coupled to a plurality of recording devices, a method obtains a first map that provides a cross-reference between a hardware address for a respective recording device and a first device identifier that is associated with the respective recording device, obtains a copy-group definition of a copy group that specifies a copy-group identifier and specifies one or more pairs of the recording devices assigned to the copy group by information, and establishes a copy-group map that provides a cross-reference between the copy-group identifier and the first device identifiers of the one or more pairs of recording devices assigned to the copy group.

The various features of the present invention and its preferred implementations may be better understood by referring to the following discussion and the accompanying drawings. The contents of the following discussion and the drawings refer more particularly to features of computer systems that conform to or are compatible with the z/Architecture™ of International Business Machines (IBM) Corporation, Poughkeepsie, N.Y. These features are set forth as examples and do not represent limitations upon the scope of the present invention.

BRIEF DESCRIPTION OF DRAWINGS

FIG. 1 is a schematic block diagram of a computer system representing a duplexing mode of remote copy operation.

FIG. 2 is a schematic block diagram of a computer system representing a suspended mode of remote copy operation.

FIG. 3 is a schematic block diagram of a computer system representing a mode of operation in which a tertiary copy or shadow copy is obtained.

FIG. 4 is a schematic block diagram of a computer system comprising primary and secondary controllers coupled to primary and secondary recording devices.

FIGS. 5A to 5E are schematic illustrations of displays presented by programs that construct and operate on maps and information structures that provide cross-reference information for recording devices according to various aspects of the present invention.

FIG. 6 is a schematic block diagram of a computer system that provides access to data recorded by a secondary recording device.

MODES FOR CARRYING OUT THE INVENTION

A. Overview

Figures 5A, 6:
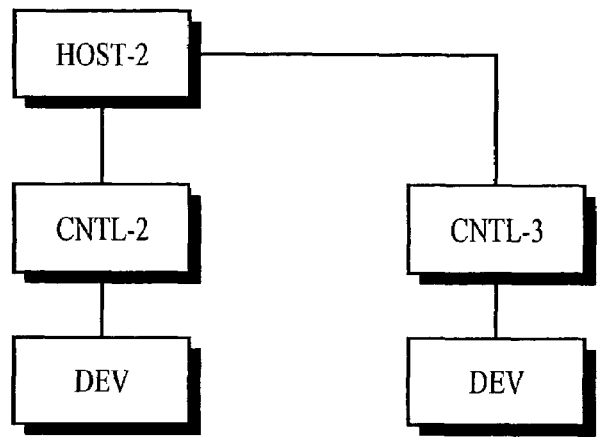

FIG. 1 illustrates a computer system in which the computer HOST-1 sends a variety of commands such as read and write commands to the primary controller CNTL-1, which in turn controls the operation of the primary recording device DEV-1 to read and write data in response to the commands received from the computer HOST-1. A communication link conveys information between the primary controller CNTL-1 and the secondary controller CNTL-2 so that a remote copy of the data recorded on the primary recording device DEV-1 can be recorded on the secondary recording device DEV-2, which is controlled by the secondary controller CNTL-2.

The computer HOST-1 may be essentially any type of information processing machine including so called mainframe computers, mini-computers and micro-computers. Examples of mainframe computers include the Skyline series of Hitachi Data Systems, Inc., Santa Clara, Calif., described in "Skyline Series Functional Characteristic," document number FE-95G9010, which is incorporated herein by reference.

The primary recording device DEV-1 and the secondary recording device DEV-2 may use essentially any type of data recording technology including magnetic, optical and solid-state technologies. The primary controller CNTL-1 and the secondary controller CNTL-2 may be essentially any type of apparatus that is suitable for controlling the operation of the recording devices. An example of a direct access storage device and suitable controller that may be used with the mainframe computers mentioned above is the model 7700E storage subsystem of Hitachi Data Systems, Inc., described in "Hitachi Freedom Storage™ 7700E User and Reference Guide," document number BO-98DD845, which is incorporated herein by reference.

The communication link between the primary and secondary controllers may comprise essentially any combination of metallic conductors, optical fibers, terrestrial or satellite radio-frequency communication paths or other communicating technology. The total end-to-end length of the link may be of any desired size. For example, the primary controller CNTL-1 and the secondary controller CNTL-2 may be located in the same room or they may be separated by thousands of kilometers.

The block diagram shown in FIG. 1 as well as the block diagrams shown in other figures do not illustrate a number of components and features that may be important in practical computer systems. For example, some computer systems have input/output subsystems that are connected to controllers by multiple high speed channel paths and associated adapters or interface circuitry. Controllers for use in such computer systems typically have multiple data paths for concurrent input/output operations and also include components for decoding device addresses. Similarly, recording devices that are direct-access disk devices in such computer systems typically include one or more read/write head assemblies and components for controlling the sequence of input/output commands that are passed to the head assemblies so that a recording medium may be accessed in some optimal manner. Still other components may provide status and diagnostic information and may be used for remote problem diagnosis and repair. These features are not critical to practice the present invention and are omitted from the figures for illustrative clarity.

Furthermore, for the sake of illustrative clarity, the secondary controller CNTL-2 is not shown connected to any computer. Generally, controllers adapted to operate with mainframe computers cannot stand alone but require a connection to a computer. This connection may be realized in a number of ways. According to one way, the secondary controller CNTL-2 is connected to the computer HOST-1 by way of some communication link not shown. This communication link may be associated with or be independent of the communication link between the primary controller CNTL-1 and the secondary controller CNTL-2. According to a second way, the secondary controller CNTL-2 may be connected to a second computer not shown in the figure. If a second computer is available, it may be used with the secondary controller CNTL-2 to provide a more complete backup system for the computer HOST-1 and the controller CNTL-1.

B. Copying Data

1. General Considerations

A number of copy techniques are known that can copy data that is stored on one or more primary recording devices onto one or more secondary recording devices. These techniques attempt to obtain on the secondary recording devices a "consistent copy" of the data recorded on the primary recording devices. A copy of the data that is recorded on the secondary recording devices is said to be consistent if it represents the exact state of the data that is or was recorded on the counterpart primary recording devices at some point in time.

For example, suppose that a sequence of two write commands update an indexed database stored on one or more primary recording devices. The first write command writes a data record. The second write command writes a counterpart index record that refers to the newly written data record. A "consistent" copy may represent the data stored on the primary recording devices at any of the following three points in time: (1) before data and index records are written, (2) after the data record is written but before the index record is written, or (3) after the data and index records are written. If a copy of the data recorded on the secondary recording device included the index record but omitted the newly written data record, that copy would not be consistent. Another example of a write command sequence that occurs in a prescribed order is the creation of a new file or dataset with a subsequent update of a file allocation table or volume table of contents.

If the data recorded on secondary recording devices is not consistent, its value for recovery purposes is severely impaired because it contains corrupted data that cannot be easily identified and corrected.

If the data recorded on secondary recording devices is consistent, it may be used to recover and provide access to the data that was stored on the counterpart primary recording devices but some processing may be required to back out incomplete transactions. A consistent copy of data may include data that reflects a partial set of updates from one or more incomplete transactions. For example, a consistent copy of a financial database may reflect the state of data that resulted from an inflight transaction transferring money between two accounts; the consistent copy may show the amount has been debited from the source account but not yet credited to the destination account.

A process that is able to back out the partial updates of all inflight transactions is able to put the secondary copy in condition for resuming normal operation.

2. Copying Techniques

A number of copy techniques are known that may be used to obtain a consistent copy of data. A "synchronous remote copy" technique receives a write command from a computer and confirms successful writing to both primary and secondary recording devices before acknowledging successful completion to the computer. An "asynchronous extended remote copy" technique receives a write command from a computer, confirms successful writing to only the primary recording device before acknowledging successful completion to the computer, and uses a complex "data mover" process to ensure the write to the secondary recording device is also successfully completed. Examples of synchronous remote copy and asynchronous extended remote copy are disclosed in U.S. Pat. Nos. 5,544,347 and 5,734,818, which are incorporated herein by reference.

Another technique known as "semi-synchronous remote copy" receives a write command from a computer, confirms successful writing to only the primary recording device before acknowledging successful completion to the computer, and reports a busy status for the primary recording device to prevent subsequent writes until a successful completion of the write command for the secondary recording device is confirmed. Examples of semi-synchronous techniques are disclosed in U.S. Pat. No. 5,742,792, which is incorporated herein by reference.

A preferred technique referred to herein as prospective suspend-time remote copy allows use of a wide variety of copying techniques such as those described above to write data to primary and secondary recording devices and is able to obtain a consistent copy on the secondary recording device by suspending writes to the secondary recording device at a prospective suspend time. This technique is described in U.S. Pat. No. 6,539,462, which is incorporated herein by reference.

C. Operational Modes

Pairs of primary and secondary recording devices may be operated in one of several operational modes. Some of these modes are briefly described below. Additional information may be obtained from the U.S. patents cited above.

1. Duplexing

The diagram shown in FIG. 1 represents a system operating in "duplexing" mode in which information is transmitted from the primary controller CNTL-1 to the secondary controller CNTL-2 so that the remote copy on the secondary recording device DEV-2 may be kept in synchronization with the data stored on the primary recording device DEV-1.

In one implementation, the computer HOST-1 operates with the primary controller CNTL-1 and the primary recording device DEV-1 as if no remote copy or duplexing feature is present. In response to write commands received from the computer HOST-1, the primary controller CNTL-1 causes data to be written to the primary recording device DEV-1. When the data has been written successfully, the primary controller CNTL-1 returns an acknowledgement informing the computer HOST-1 that the write completed successfully. Alternatively, the primary controller CNTL-1 may operate in a "fast-write mode" in which write commands are stored in non-volatile storage and an acknowledgement is returned to the computer HOST-1 as soon as the command is stored. The actual write to the primary recording device DEV-1 is performed later.

While operating in "duplexing" mode, the primary controller CNTL-1 sends information about the write command to the secondary controller CNTL-2, which causes a corresponding update to be made to data recorded on the secondary recording device DEV-2. In one implementation, the information sent to the secondary controller CNTL-2 is in the form of an update information descriptor (UID) that specifies a time stamp, a controller identifier, a recording device identifier, the track number or record number on the device that is affected by the write command, and the data to be written to the recording device. The UID uniquely identifies the location and content of the data to be written and the system time when the corresponding write command was issued by the host computer. If the computer is part of a multi-processor complex, the time stamp is provided by a clock that is shared by all of the processors in the complex.

For ease of discussion, the term "UID" is used herein to describe the update information that the primary controller CNTL-1 sends to the secondary controller CNTL-2 even though other forms and content of information may be used.

The secondary controller CNTL-2 receives the UID and causes the appropriate secondary recording device DEV-2 to record the appropriate data at the appropriate location on that device. When the write has completed, the secondary controller CNTL-2 sends an acknowledgement to the primary controller CNTL-I indicating the write to the secondary recording device DEV-2 was successful. Alternatively, the secondary controller CNTL-2 may operate in a fast-write mode by acknowledging that the update for the write command has been stored and will be carried out later.

If the update to the secondary recording device DEV-2 cannot be completed successfully, the secondary controller CNTL-2 may send a negative acknowledgement to the primary controller CNTL-1. In addition, the primary controller CNTL-1 may assume a negative acknowledgement if a positive acknowledgement is not received within some period of time.

2. Suspended

The diagram shown in FIG. 2 represents a computer system operating in a "suspended" mode, in which information is not transmitted from the primary controller CNTL-1 to the secondary controller CNTL-2 to keep the remote copy on the secondary recording device DEV-2 in synchronization. As a result, the remote copy is allowed to become increasingly out of date as subsequent commands received from the computer HOST-1 cause data recorded on primary the recording device DEV-1 to be changed. Some indication of the changed data that occurs as a result of these subsequent commands is stored in the information storage device STORE. In preferred implementations, the information storage device STORE is non-volatile random access memory (RAM). This device is sometimes referred to as a "cache" for some implementations of controllers.

In a preferred implementation, the primary controller CNTL-1 initiates the suspended mode of operation at a time specified in a "suspend" command received from the computer HOST-1. The suspend command specifies a prospective or future suspend time. After the suspend time passes, the primary controller CNTL-1 begins operating in the suspended mode of operation. In this mode, the primary controller CNTL-1 responds to each write command received from the computer HOST-1 by causing the primary recording device DEV-1 to update recorded data as described above and by storing information in the information storage device STORE that indicates the data affected by each write command received while in the suspended mode. The primary controller CNTL-1 stops sending UID information to the secondary controller CNTL-2. In an alternative implementation, it also notifies the secondary controller that a suspended mode of operation has begun.

The suspended mode of operation may be initiated so that various applications such as, for example, long-running batch applications may have access to data that is not subject to change. Some type of post-processing may be required to back out incomplete transactions. Essentially any process for backing out incomplete transactions may be used. Back out processes that require the use of transaction journals may be provided with journals that are stored in the remote copy and are, therefore, known to be consistent with the associated data files and databases.

This suspended mode of operation may also be used to obtain a "shadow copy" as described below.

3. Shadow Copying

Unless some protective measure is taken, the remote copy recorded on the secondary recording device DEV-2 is vulnerable to corruption if the primary controller CNTL-1, the communication link or some other associated apparatus should fail while operating in the pending or duplexing mode. Such a failure could cause an abrupt termination in processing that changes data on the secondary recording device DEV-2.

One way in which this vulnerability can be covered is occasionally to make a shadow copy of the remote copy recorded on the secondary recording device DEV-2. This can be done safely while the primary controller CNTL-1 operates in suspended mode and the remote copy that is recorded on the secondary recording device DEV-2 is known to be consistent. The diagram shown in FIG. 3 represents this mode of operation in which the shadow copy is written onto the tertiary recording device DEV-3. Upon completion of this copy operation, the data recorded on the tertiary recording device DEV-3 will represent the latest consistent remote copy of the data that is recorded on the primary recording device DEV-1.

Preferably, the primary controller CNTL-1 notifies the secondary controller CNTL-2 when the suspended mode is initiated and when the duplexing mode is to be resumed so that the shadow copy can be scheduled properly. Preferably, the primary controller CNTL-1 will also refrain from resuming duplexing mode unless it has received an acknowledgement from the secondary controller CNTL-2.

D. Channel Subsystem

Features of an input/output (I/O) subsystem of a computer system that conforms to the IBM z/Architecture mentioned above are described in IBM publication "z/Architecture Principles of Operation," SA22-7832-01, June 2003, and in Cormier et al., "System/370 Extended Architecture: The Channel Subsystem," IBM J. Res. Develop., vol. 27, no. 3, May 1983, pp. 206-218, both of which are incorporated by reference. Some features of this architecture are relevant to a particular implementation of the present invention but in general they are not essential.

According to this implementation, each recording device or other type of I/O device is represented in the I/O subsystem by a particular device identifier referred to as a device number. Programs executing in the computer system refer to a particular device number to identify which I/O device they wish to use. In response to an I/O request from a program that specifies a device number, the I/O subsystem determines the hardware address of the I/O device and any associated controller, determines a communication path or "channel path" to use for accessing the device, and constructs one or more I/O programs for execution to carry out the I/O operations requested by the program. These I/O programs, referred to as channel programs, each comprise one or more channel command words (CCW) that may be executed in whole or in part by logic or processors in the host computer, in the channel path or associated interface circuitry, in the I/O device or in a controller coupled to the I/O device. In one implementation, the CCWs are executed by processors in a controller that is coupled to the desired I/O device.

If a recording device is included in multiple computer systems, the relationship between device number and hardware address for the recording device generally will be unique for each computer system. This difference can interfere with efforts to recover from disasters and other disruptive events using conventional DR mechanisms because some aspects of the recovery mechanism rely on device numbers and other aspects rely on hardware addresses. One implementation of the present invention overcomes this problem by generating and maintaining maps that provide a cross-reference between device numbers and hardware addresses for one or more computer systems.

E. Device Cross-Reference Map

1. Single System

FIG. 4 illustrates a computer system in which the computer HOST-1 is coupled to the controllers CNTL-1 and CNTL-2. Each of the controllers is coupled to one or more recording devices DEV. In one implementation of the present invention, a program referred to herein as YKSCAN executing in the computer HOST-1 receives input that specifies one or more device numbers and obtains the hardware address for the recording device identified by each device number. The YKSCAN program then constructs a map that provides a cross-reference between device numbers and hardware addresses. The map is recorded in storage, which may be a recording device coupled to a controller or it may be some other type of data recording device either within the I/O subsystem or independent of the I/O subsystem. For example, the map could be stored in non-volatile random access memory in the controller, in the computer, or in some other device.

In one implementation, the recording devices DEV have recording media that are arranged in volumes or partitions that each have an identifier. Each volume or partition may coincide with a distinct physical media, it may represent part of a distinct physical medium, or it may represent all or some portion of multiple physical media. In systems that conform to the IBM z/Architecture, the medium identifier is referred to as a volume serial number or "volser." Although a medium identifier is not required and no particular identifier is critical to the present invention, preferred implementations of the YKSCAN program also obtain the media identifiers for the recording devices associated with the device numbers and includes this information in the map so that it also provides a cross-reference to the media identifiers.

Figure 7:
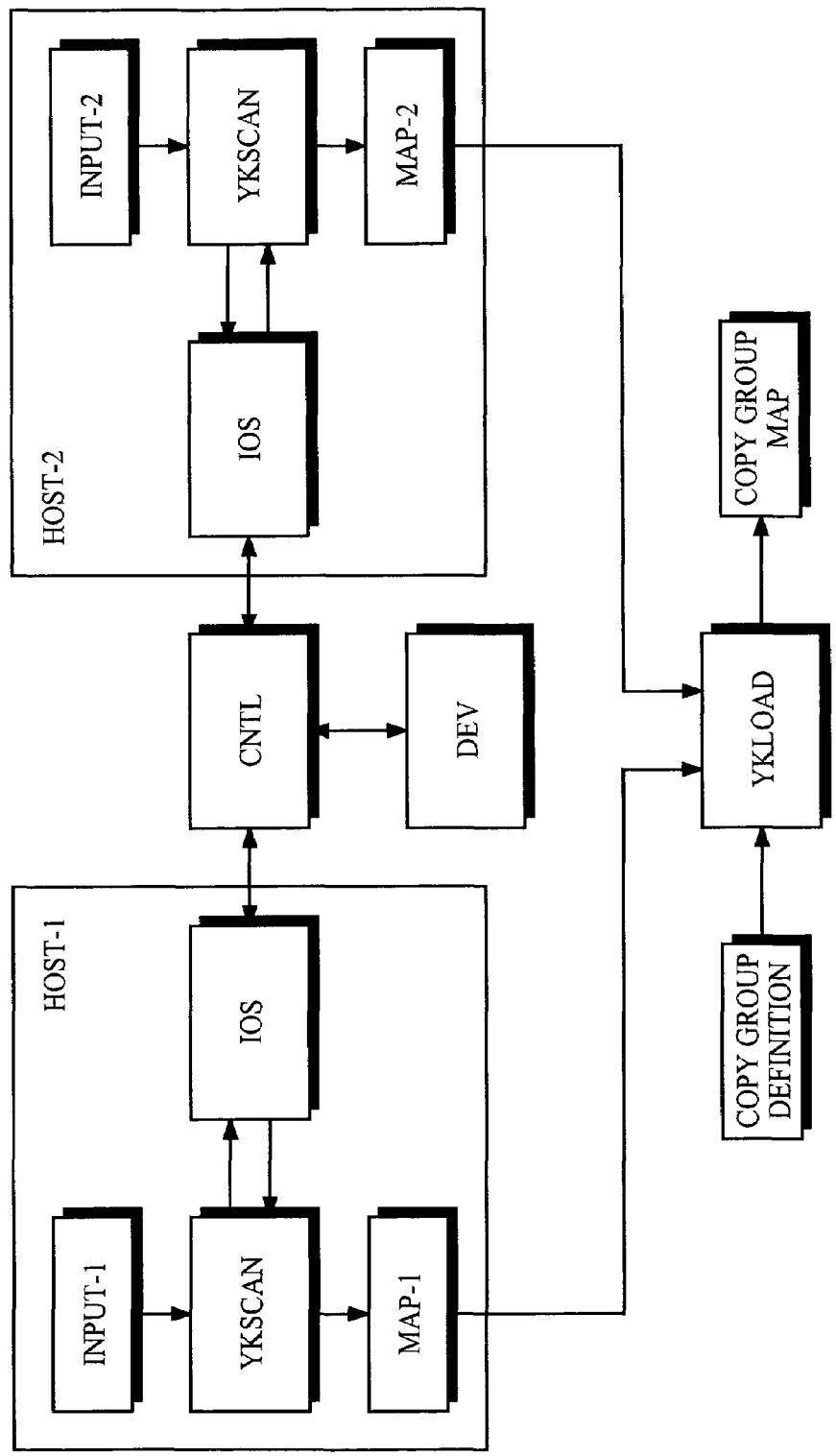
FIG. 7 is a schematic block diagram of one implementation of a complex of computer systems that incorporate various aspects of the present invention.

FIG. 7 provides a schematic illustration of a preferred implementation for a computer system that conforms to the IBM z/Architecture. In this implementation, the YKSCAN program executes in the computer HOST-1 and receives an input INPUT-1 that specifies a device number identifying the recording device DEV. In response to the input, the YKSCAN program performs an execute-channel-program (EXCP) instruction for the specified device number, which causes the I/O subsystem IOS to route one or more CCWs in a designated channel program through a channel path to the appropriate controller CNTL for execution. In response, the controller CNTL obtains the hardware address for the recording device DEV coupled to the controller that corresponds to the specified device number. The hardware address obtained by the controller is returned to the YKSCAN program through a channel path to the I/O subsystem IOS in much the same way as information is returned in response to other types of I/O requests. If desired, the controller CNTL may determine the capabilities of each I/O device to which it is coupled and provide hardware addresses for only those devices that have one or more prescribed capabilities. The controller may also include the medium identifier for the recording device in the information returned from the controller that conveys the hardware address. The YKSCAN program can associate the hardware address and any other information returned in response to a particular channel program with the device number specified in that channel program and use this association to establish a map MAP-1 that provides a cross-reference between the hardware address, the device number and, if available, the medium identifier.

In this implementation, the hardware address comprises information known as the array identifier, which identifies the controller, the subsystem identifier (SSID), the logical subsystem (LSS) identifier or control unit number, and the command control address (CCA) or logical volume index, which the controller hardware uses to access the I/O device. No particular format or content of the hardware address is critical in principle to the present invention.

Although a program such as the YKSCAN program described above may be implemented in a variety of ways, a preferred implementation allows operator interaction through a full-screen interface rather than a so called command-line interface. FIGS. 5A and 5B schematically illustrate an implementation that may be presented on IBM 3270-type terminals using the IBM Interactive Structured Program Facility (ISPF). The display shown in FIG. 5A allows an operator to specify a range of device numbers. The display shown in FIG. 5B presents the medium identifier, device number and hardware address information obtained by the YKSCAN program for the recording devices that are coupled to a particular controller. After the YKSCAN program constructs the cross-reference map described above, contents of the map may be presented to the operator if desired. A hypothetical presentation of the map contents is illustrated schematically in FIG. 5C.

2. Multiple Systems

FIG. 6 illustrates a second computer system in which the computer HOST-2 is coupled to the controllers CNTL-2 and CNTL-3. Each of these controllers is coupled to one or more recording devices DEV. The controller CNTL-2 and the recording devices DEV that are coupled to this controller are the same controller CNTL-2 and coupled recording devices that are illustrated in FIG. 4.

In one implementation illustrated schematically in FIG. 7, a YKSCAN program executing in the computer HOST-2 receives an input INPUT-2 specifying a device number identifying a recording device DEV and, in the same manner as that described above for the program executing in the computer HOST-1, obtains information needed to construct a second map MAP-2 that provides a cross-reference between device numbers and hardware addresses that are valid within the context of the second computer system. In general, the cross-reference provided by the second map MAP-2 will differ from the cross-reference provided by the first map MAP-1 for the first computer system described above. In preferred implementations, the second map also provides a cross-reference to media identifiers. The second map may be conveyed to the first computer system or some other computer system for subsequent processing, which is described below. The second map may also be stored by the second computer system.

F. Copy Pairs and Copy Groups

Using information in the map constructed by the YKSCAN program, copy pairs of primary and secondary recording devices can be defined in terms of device numbers, hardware addresses and/or media identifiers. In this implementation, a particular pair can be identified by any one of five parameters: (1) the medium identifier, (2) the device number for the primary recording device, (3) the device number for the secondary recording device, (4) the hardware address of the primary recording device, or (5) the hardware address of the secondary recording device. This flexibility allows an operator to establish and change copy-pair definitions by specifying whatever parameter is easiest to use. Programming interfaces may simplify this task by allowing an operator to select recording devices from lists generated from the map.

When the data to be copied is stored on more than one recording device, a copy pair is defined for each primary recording device. Although it is possible to manage various remote copy functions by specifying operations for individual copy pairs, this approach is not attractive in situations where operations must be specified for many copy pairs. Situations that require operations on thousands of copy pairs are not uncommon.

The present invention facilitates the management of multiple copy pairs by allowing groups of copy pairs to be defined and allowing various operations to be specified for all pairs in a copy group. For example, a command to suspend all copy pairs in a group may be initiated by invoking a single suspend command for the group. The schematic display shown in FIG. 5D is presented by a program that allows an operator to browse a copy-group definition and to change the copy-group definition by adding and deleting copy pairs. Thereafter, an operator can specify operations on groups of copy pairs by merely referring to the group. An example of a display presented by a program that supports operations on copy groups is shown schematically in FIG. 5E.

Programs that perform operations on a group of copy pairs require a specification of the copy pairs that refers to recording devices by device numbers; however, copy pairs and groups can usually be defined much more easily in terms of media identifiers or hardware addresses. Defining and using a group of a large number of copy pairs can be facilitated by a copy-group map that provides a cross-reference between a copy-group identifier and the device numbers and hardware addresses of the recording devices of the copy pairs that are included in the copy group. By establishing this copy-group map dynamically, copy pairs and groups of copy pairs can be defined by information other than device numbers such as hardware addresses or media identifiers, and these device numbers can be resolved from the appropriate hardware addresses when needed.

In one implementation shown schematically in FIG. 7, a program referred to herein as YKLOAD constructs a copy-group map by obtaining maps of devices such as the maps MAP-1 or MAP-2 constructed by the YKSCAN programs described above, obtaining the definition of a copy group and an identifier of the copy group, and establishing a cross-reference between this information by constructing a table or other structure that provides a direct link between the pairs of recording devices in a specific copy-pair group and the device numbers for those recording devices. Preferably, this information also includes media identifiers. The copy-group map that is constructed by the YKLOAD program may be stored in a manner similar to the way the YKSCAN maps are stored. The copy-group map may include information from more than one computer system by using YKSCAN maps from more than one computer system, as discussed above. The copy-group map may be established by executing the YKLOAD program in the computer HOST-1, in the computer HOST-2, or in another computer as may be desired.

G. Efficiency Considerations

I/O subsystem commands may be executed concurrently to reduce the elapsed time needed to complete operations with multiple recording devices and copy pairs. This may be accomplished by providing an I/O interface routine that is capable of invoking multiple concurrent channel programs. If desired, the number of concurrent invocations may be limited and subsequent requests can be queued for subsequent processing.

In one implementation for a computer system using the IBM Multiple Virtual Systems (MVS) operating system, a low-level I/O program referred to herein as YKIO may be invoked by OS/390 CALL, LINK or ATTACH procedures to initiate the execution of a channel program and respond to various error conditions that may be encountered. Preferably, the YKIO program is reentrant to facilitate concurrent operations. The YKIO program should be capable of communicating with offline as well as online recording devices; therefore, the YKIO program should execute in an environment that provides a sufficient level of authorization to access offline devices.

Access to offline devices may be provided to channel programs that are invoked by an EXCP (execute channel program) command by manipulating control bits in the Unit Control Block (UCB) of the offline device to make the device appear to be online. Use of the UCB may be serialized using the MVS ENQ facility to prevent other programs from using the UCB until the control bits are reset. Alternatively, manipulation of UCB control bits can be avoided by implementing the YKIO program as an "I/O Driver" that can make calls to the MVS I/O Supervisor for direct access to offline devices.

Other alternatives may be considered to further improve efficiency such as fixing in real memory one or more pages of virtual memory containing I/O buffers and channel programs. This approach not only avoids inefficiencies caused by paging operations but it also reduces the overhead needed to perform CCW address translations.

H. Alternative Implementations

Many aspects of the present invention have been described in technical terms that are pertinent to features of the IBM z/Architecture mentioned above. These features are similar or equivalent to features of other computer system architectures; therefore, the features of implementation that are described here are presented as examples. For example, the device number mentioned above is a specific example of a device identifier that is provided by an operating system to allow programs to address I/O commands and operations to a specific device. The device identifier that is provided by other operating systems may be known by other terms such as logical unit number (LUN) or device path name.

Various aspects of the present invention may be carried out by hardware or program-controlled processors. Programs may be implemented using essentially any programming language. For computer systems that comply with the IBM z/Architecture, the source code of programs may be written in OS/390 assembler, C++, TSO CLIST and Rexx languages, for example. The programs that implement the present invention may be conveyed by a variety of media such as baseband or modulated communication paths throughout the spectrum including from supersonic to ultraviolet frequencies, or storage media that convey information using essentially any recording technology including magnetic tape, cards or disk, optical cards or disc, and detectable markings on media like paper.

The invention claimed is:

1. In a system comprising a first computer coupled to first and second storage devices, a method for providing copies of data, the method comprising:
   cross-referencing (a) a hardware address identifying the first storage device and (b) a first device identifier for representing the first storage device to a program in the first computer;
   cross-referencing (a) a hardware address identifying the second storage device and (b) a first device identifier for representing the second storage device to a program in the first computer;
   pairing the first and second storage devices;
   adding the pair, by information other than first device identifiers, to a copy group already containing another storage-device pair;
   identifying the copy group;
   cross-referencing the copy-group identifier and the first device identifiers of the pair; and
   preparing to copy data, using the cross-reference.

2. The method according to claim 1 that comprises:
   receiving a first input specifying one or more first device identifiers;
   obtaining one or more hardware addresses in response to the first input; and
   establishing the first map by associating the one or more hardware addresses with one or more first device identifiers.

3. The method according to claim 2, wherein:
   the first computer receives the first input and, in response, sends one or more commands to a respective controller;
   the respective controller obtains at least some of the one or more hardware addresses in response to the one or more commands by interrogating either or both of control information in the respective controller and recording devices coupled to the respective controller, and sends the obtained hardware addresses to the first computer; and
   the first computer establishes the first map.

4. The method according to claim 3, wherein:
   the first computer comprises a channel subsystem that controls transfers of data between the first computer and one or more recording devices coupled to the respective controller;

the first computer is coupled to the respective controller by a first data communication path that is a channel path coupled to the channel subsystem;

the one or more commands are conveyed to the respective controller by a channel program comprising one or more channel command words generated by the channel subsystem; and hardware addresses obtained by the respective controller are conveyed to the first computer through the first data communication path as one or more responses to the channel program.

5. The method according to claim 3, wherein the respective controller determines whether a respective recording device is capable of responding to a query command and returns the hardware address of the respective recording device only if the respective recording device is capable of responding to the query command.

6. The method according to claim 1, wherein each of the plurality of recording devices has a recording medium with a medium identifier that identifies the recording medium, and the first map also provides a cross-reference between medium identifiers and either or both of hardware addresses and first device identifiers for respective recording devices, and wherein the method comprises:

establishing the copy-group map also to provide a cross-reference between the copy-group identifier and the medium identifiers for the one or more pairs of recording devices assigned to the copy group.

7. The method according to claim 1, wherein the system comprises a second computer coupled to one or more controllers of which at least one of the controllers is coupled to one or more recording devices that are in the one or more pairs of recording devices assigned to the copy group, the method comprising:

obtaining a second map that provides a cross-reference between the hardware address of the respective recording device and a second device identifier that is associated with the respective recording device, wherein the second device identifier represents the respective recording device to programs executing in the second computer; and establishing the copy-group map also to provide a cross-reference between the copy-group identifier and the second device identifiers of the one or more recording devices that are in the one or more pairs of recording devices assigned to the copy group.

8. The method according to claim 7 that comprises:

receiving a second input specifying one or more second device identifiers;

obtaining one or more hardware addresses in response to the second input; and establishing the second map by associating the one or more hardware addresses with the one or more second device identifiers.

9. The method according to claim 8, wherein:

the second computer receives the second input and, in response, sends one or more commands to a respective controller;

the respective controller obtains at least some of the one or more hardware addresses in response to the one or more commands by interrogating either or both of control information in the respective controller and recording devices coupled to the respective controller, and sends these obtained hardware addresses to the second computer; and the second computer establishes the second map.

10. The method according to claim 9, wherein:

the second computer comprises a channel subsystem that controls transfers of data between the second computer and one or more recording devices coupled to the respective controller;

the second computer is coupled to the respective controller by a second data communication path that is a channel path coupled to the channel subsystem;

the one or more commands are conveyed to the respective controller by a channel program comprising one or more channel command words generated by the channel subsystem; and hardware addresses obtained by the respective controller are conveyed to the second computer through the second data communication path as one or more responses to the channel program.

11. A storage medium wherein is located a computer program for executing the method of claim 1.

12. A storage medium wherein is located a computer program for executing the method of claim 2.

13. A storage medium wherein is located a computer program for executing the method of claim 3.

14. A storage medium wherein is located a computer program for executing the method of claim 4.

15. A storage medium wherein is located a computer program for executing the method of claim 5.

16. A storage medium wherein is located a computer program for executing the method of claim 6.

17. A storage medium wherein is located a computer program for executing the method of claim 7.

18. A storage medium wherein is located a computer program for executing the method of claim 8.

19. A storage medium wherein is located a computer program for executing the method of claim 9.

20. A storage medium wherein is located a computer program for executing the method of claim 10.

21. A computer system comprising
a CPU;
the storage medium of claim 11; and
a bus coupling the CPU and the storage medium.

22. A computer system comprising:
a CPU;
the storage medium of claim 12; and
a bus coupling the CPU and the storage medium.

23. A computer system comprising:
a CPU;
to the storage medium of claim 13; and
a bus coupling the CPU and the storage medium.

24. A computer system comprising:
a CPU;
the storage medium of claim 14; and
a bus coupling the CPU and the storage medium.

25. A computer system comprising:
a CPU;
the storage medium of claim 15; and
a bus coupling the CPU and the storage medium.

26. A computer system comprising:
a CPU;
the storage medium of claim 16; and
a bus coupling the CPU and the storage medium.

27. A computer system comprising:
a CPU;
the storage medium of claim 17; and
a bus coupling the CPU and the storage medium.

28. A computer system comprising:
a CPU;
the storage medium of claim 18; and
a bus coupling the CPU and the storage medium.

29. A computer system comprising:
a CPU;
the storage medium of claim 19; and
a bus coupling the CPU and the storage medium.

30. A computer system comprising:
a CPU;
the storage medium of claim 20; and
a bus coupling the CPU and the storage medium.

31. The method of claim 1 wherein the preparing to copy data comprises
preparing to recover data.

32. The method of claim 1 further comprising:
recovering data, using the cross-reference.

* * * * *